Figure 1:
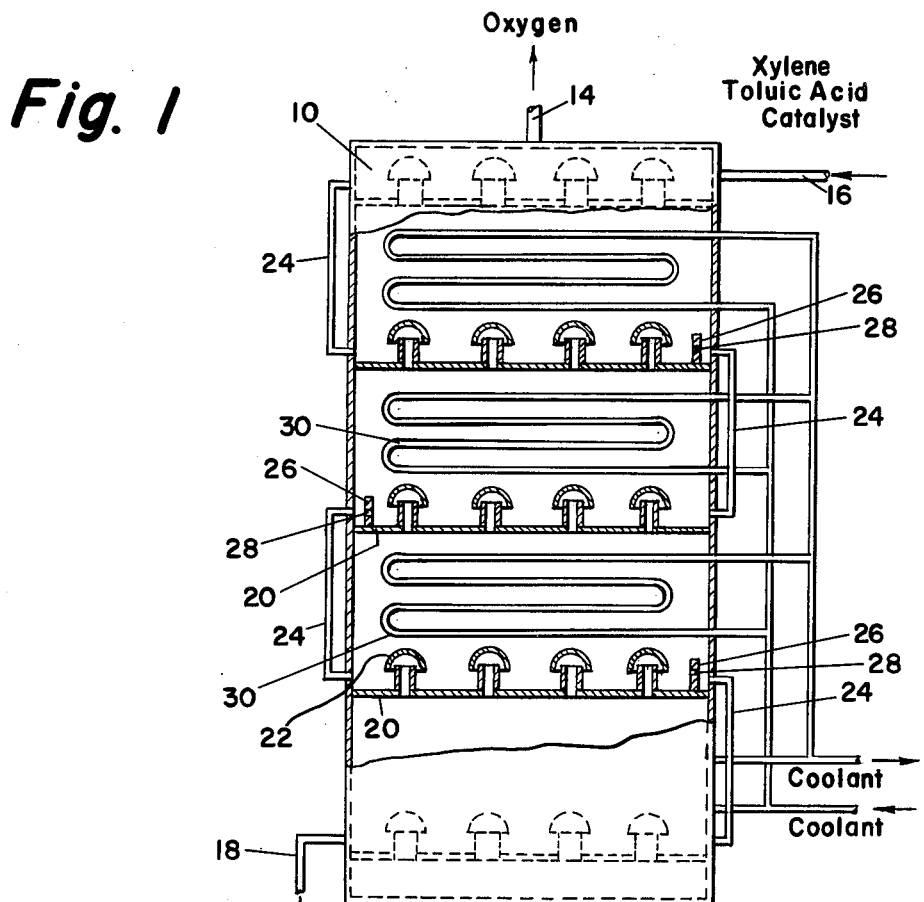

Aug. 10, 1965 J. F. DEMPSEY 3,199,959
REACTOR FOR PREPARATION OF CARBOXYLIC AROMATIC ACIDS
Original Filed March 4, 1958

INVENTOR.
JAMES F. DEMPSEY
BY George F. Church
ATTORNEY

United States Patent Office 3,199,959
Patented Aug. 10, 1965

3,199,959
REACTOR FOR PREPARATION OF CARBOXYLIC AROMATIC ACIDS
James F. Dempsey, Claymont, Del., assignor to Sun Oil Company, Philadelphia, Pa., a corporation of New Jersey
Original application Mar. 4, 1958, Ser. No. 719,079, now Patent No. 3,077,497, dated Feb. 12, 1963. Divided and this application Oct. 24, 1962, Ser. No. 238,820
3 Claims. (Cl. 23—283)

This application is a division of application Serial No. 719,079 filed March 4, 1958, by the present inventor and now issued as Patent No. 3,077,497.

This invention relates to the oxidation of alkylated aromatics to form mono- and polycarboxylic aromatic acids, and more particularly to a method and means for increasing the rate of oxidation.

It is known in the art to oxidize xylenes, especially a mixture of m-xylene and p-xylene, to form phthalic acids, by contacting with a free oxygen-containing gas, in the presence of an oxidation catalyst. Such a process has not been entirely satisfactory for several reasons. The reaction is characterized by a slow reaction rate which requires a long residence time in the reactor. The rate of reaction depends upon several factors, one of which is the rate of diffusion of the oxygen-containing gas into the liquid phase and the intimacy of contact therewith. The driving force for this diffusion is the partial pressure of oxygen in the gas. The reaction is highly exothermic, resulting in the evaporation of xylene, which greatly reduces the partial pressure of the oxygen. In many cases the oxygen partial pressure at the outlet from the reactor is as little as 7% or less of the inlet partial pressure.

In order to prevent excessive evaporation of xylene, it has been proposed to use cooling coils in the reaction mixture. The reaction products, however, are insoluble, and are deposited on the cooling coils, thereby greatly reducing their effectiveness.

It is an object of this invention to provide a process whereby a more intimate contact between oxygen and xylene is obtained. It is another object to provide a process where the partial pressure of oxygen is maintained at a high level. Still another object is to provide a method whereby heat exchange apparatus used to maintain the reaction temperature cannot become fouled with solid products. A further object is to provide effective cooling of the oxidation reaction medium. Finally, it is an object to provide a new reactor for the oxidation of xylenes.

According to one embodiment of the process of this invention, the above-described process is modified in that the xylenes are contacted by the free oxygen-containing gas in a plurality of vertically spaced apart contacting zones, the oxygen being admitted to the reactor at a point below the contacting zones and removed from the reactor at a point above the contacting zones. The gas is cooled between each of the contacting zones, thereby condensing xylene vapors which have been evaporated from the preceding contacting zone and carried along with the oxygen-containing gas.

The reactor of this invention in which the above described process is preferably carried out comprises essentially a modified bubble-cap plate tower. The tower is provided with a plurality of horizontal plates, or trays, which are usually substantially equally spaced apart vertically in the upright tower, although such equal spacing is not necessary. Liquid xylene passes down the tower from plate to plate by means of suitable downflow pipes. The entrances to the downflow pipes may constitute weirs over which the xylene must flow, the height of the weirs determining the depth of liquid which is maintained on the plate. Heat exchanging means are positioned between adjacent plates in such a manner that each heat exchanger is positioned above the level of liquid on the plate below it. A coolant flows through the conduits of the heat exchanger. The free oxygen-containing gas rises through bubble-caps in each of the trays in series, causing oxidation of the xylenes therein. A portion of the xylenes are converted to toluic acids, whereas another portion is more fully oxidized to form phthalic acids, and still another portion is not oxidized at all. This oxidation reaction is highly exothermic, so that a part of the xylenes are vaporized and carried off with the oxygen-containing gas. This results in a serious decrease in the partial pressure of the oxygen. Upon contact with the heat exchanger, however, the xylenes are condensed and fall back into the tray. The oxygen partial pressure is thereby restored, so that upon passage up the tower through the next bubble tray, the oxygen is readily diffused through the reaction mixture therein, and intimately contacts the xylenes and toluic acid so that phthalic acids are prepared at a relatively high rate.

Upon passing through the uppermost tray, the oxygen-containing gas is then passed through a condenser to condense xylene vapor which is conveniently returned to the reaction process. The oxidized xylene reaction mixture is drawn off the bottom of the tower and phthalic acid is separated, as by filtration. The filtrate, containing unreacted xylene, toluic acid, oxidation catalyst, and water, is distilled to remove water, and returned to the top of the tower. Additional xylene is added, and the process is repeated.

Figure 2:
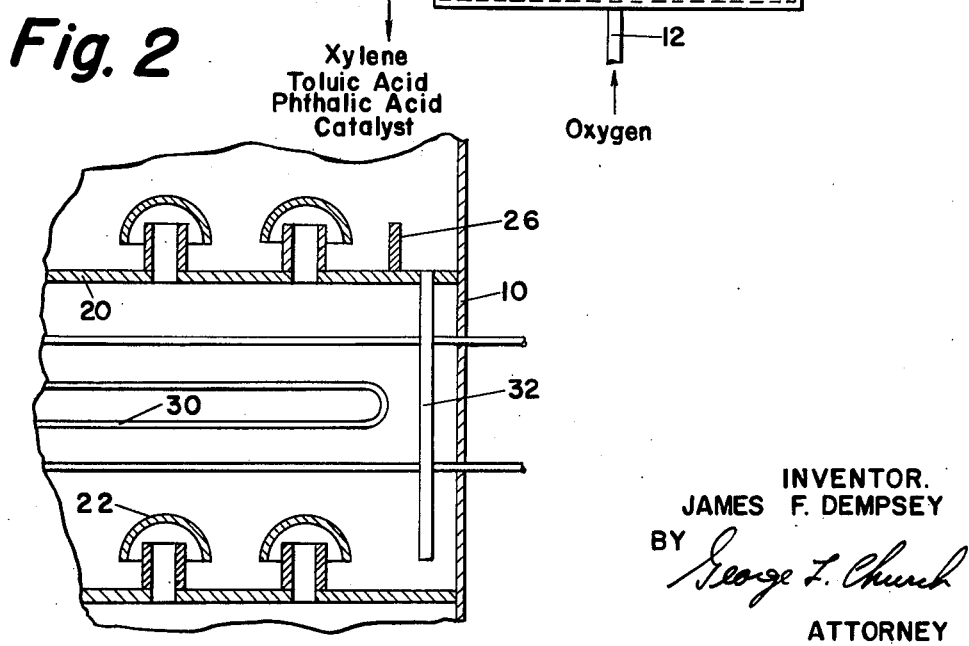

For a better understanding of the invention, reference is now made to the drawing in which FIGURE 1 is an elevational view of the reactor of the invention with parts broken away, and FIGURE 2 is a partial sectional elevational view showing a modification of the downpipes of the reactor.

Referring to FIGURE 1, 10 is the vertically elongated reactor shell, having an oxygen inlet conduit 12, an oxygen outlet conduit 14, a charge liquid inlet conduit 16, and a product outlet conduit 18. Oxygen, or an inert gas containing free oxygen, is fed into the lower end of the reactor shell 10 through oxygen inlet conduit 12, and passes through bubble trays 20 having bubble caps 22. The reactor is fitted with a plurality of such bubble trays 20, vertically spaced apart throughout substantially the entire length of the reactor. The charge liquid, which usually consists of xylene, toluic acid, and oxidation catalyst, is fed into the top of the reactor, through conduit 16, onto the uppermost bubble tray 20. Each of the bubble trays 20 containing the charge liquid constitutes a contacting zone, or reaction zone, where the charge liquid is contacted by oxygen. The charge liquid flows across the uppermost bubble tray and passes to the next bubble tray below it through a downpipe 24. It then flows to the next lower bubble tray 20 through another downpipe 24, and so on until it reaches the lowermost bubble tray, from which the liquid is withdrawn through outlet conduit 18. The liquid level on each of the bubble trays is maintained by a weir 26 on the bubble tray between the bubble caps 22 and the inlet to downpipe 24. Weirs 26 are each perforated by a plurality of small weep holes 28 placed near the the bottom of the weir. These weep holes 28 allow the passage of a small amount of liquid so that the liquid between the weir and outlet 24 is kept in agitation, thereby preventing the settling of solid products. The total area of the weep holes is very small in comparison to the flow of liquid, so that the liquid level is maintained at the top of the weir. Such weep holes are not a necessary part of the apparatus, however, since other means also provide suitable agitation.

The oxygen passing upward in the reactor passes through the bubble caps, which are suitably grooved, slotted or perforated in a manner well known in the art so that the oxygen is broken up into streams of very small bubbles, thereby providing intimate contact with the liquid. The xylene is thereby oxidized to toluic acids and phthalic acids, with the evolution of heat. This heat vaporizes a portion of the xylenes, together with water, which is a product of the oxidation, and these are carried out of the liquid with the oxygen, thereby reducing the partial pressure of the oxygen. This gaseous mixture then contacts a heat exchanger 30, whereupon the xylenes and at least a portion of the water are condensed and fall back into the bubble tray. A suitable coolant, such as water, flows through the heat exchanger conduit. The cooled oxygen passes upwardly to the next higher bubble tray 20 and through bubble caps 22, where the process is repeated. Evaporation of xylenes from ecah of the bubble trays serves to extract heat from the liquid therein, thereby maintaining the temperature of the liquid.

The product removed through conduit 18 is a slurry of phthalic acids in xylene and toluic acid, together with oxidation catalyst. The solid phthalic acids are separated by conventional means not shown, as by distillation and filtering. The remaining solution of toluic acids and xylenes is returned to charge liquid inlet 16 together with additional xylenes.

Although this invention has been described herein principally in terms of the oxidation of xylenes to form phthalic acids, it is also applicable to the preparation of other monocarboxylic and polycarboxylic acids by the oxidation of the corresponding alkylated aromatics. For example, the process and apparatus of this invention are used in the preparation of benzoic acid from toluene, and toluic acids from xylenes. The process is also applicable to the oxidation of toluic acid and the esters of toluic acid to form phthalic acids or partial esters theerof.

Generally the xylenes used in this process are a mixture of m-xylene and p-xylene, although the individual xylenes are also oxidized separately by this process. It is presumed that the xylenes are first oxidized to the corresponding toluic acids, since these are present in the products removed through outlet 18. These toluic acids in turn are oxidized to the corresponding phthalic acids. Thus, m-xylene is converted to isophthalic acid, and p-xylene to terephthalic acid.

Any suitable oxidation catalyst may be used, including the well known metallic oxidation catalysts, constituting compounds of metals such as cobalt, manganese, lead, iron, cerium, nickel, copper, chromium, etc., such compounds including for example the oxides, hydroxides, acetates, toluates, naphthenates, oleates, acetylacetonates, etc. Cobalt compounds such as cobalt acetate or cobalt naphthenate are preferred, since these promote high rates of reaction and high yields. Any suitable free oxygen-containing gas can be employed according to the invention, e.g., air, pure oxygen, or oxygen in admixture with various inert gases.

The reaction is carried out under oxiding conditions well known in the art. Generally a temperature of from 250° F. to 400° F. is used, together with a pressure sufficient to maintain a liquid phase on the bubble trays. Pressures of from atmospheric to 500 p.s.i.g. are used with good results. These conditions are conveniently maintained by regulation of the temperature and rate of flow of the coolant through heat exchangers 30.

The charge stock admitted to the reactor through conduit 16 attains an increasing degree of oxidation as it passes from each bubble tray 20 to the next lower tray. The number of trays used depends on economical and physical considerations, being limited by the allowable height of the tower and the cost of adding additional stages.

The mixture of phthalic acids produced by the above-described process is usually separated into the individual acids by dissolution in various suitable solvents. The meta-acid, commonly known as isophthalic acid, is useful in the preparation of unsaturated polyester resins for reinforced plastics, and as an intermediate in the preparation of dyes, and pharmaceuticals. Terephthalic acid, the para-acid, is also used in the preparation of polyester resins and plasticizers.

Many modifications within the scope of this invention will be apparent to those skilled in the art. For example, downpipes are preferably placed outside the reactor for ease of cleaning, but they may also be placed inside adjacent the wall of reactor shell 10, as shown at 32 in FIGURE 2. In this modification, the downpipe inlet is positioned in the bottom of each tray 20 for ease of draining the apparatus. Other means of agitating the liquid between the weir and the downpipe inlet may be used. For example, in the modification shown in FIGURE 2, agitation is provided by the flow of liquid over the weir and into the space between the weir and the wall of the tower. In addition, other means of passing a gaseous material upwardly into contact with a liquid in a plurality of contacting zones may be used. For example, a sieve-type bubble tray is conveniently used in place of the bubble cap type described herein. Sieve-type bubble trays, such as are described on pages 499 and 500 of "Chemical Process Machinery" by E. Raymond Riegel, are well known in the art, and no further description herein is necessary.

The invention claimed is:

1. A reactor for the preparation of carboxylic aromatic acids which comprises a reactor shell, an oxygen inlet conduit in the lower portion of said shell, an oxygen outlet conduit in the upper portion of said shell, a plurality of vertically spaced apart bubble trays between said inlet and said outlet, means for admitting a charge liquid to the uppermost of said bubble trays, means including a downpipe for conducting said liquid charge from each of said trays to the tray immediately therebelow, means for removing said liquid, together with reaction products, from the lowermost tray, and heat exchange means for removing heat from vapors rising from a lower tray to an upper tray, said heat exchange means being positioned beneath said upper tray and above the upper end of the downpipe for conducting liquid charge from said lower tray to the tray immediately therebelow.

2. A reactor as defined by claim 1 including bubble caps on each of said bubble trays, a weir between said bubble caps and the inlet to said downpipe, and weep holes in the lower portion of said weir.

3. A reactor as defined by claim 1 including bubble caps on each of said bubble trays, an inlet to said downpipe in the bottom of each of said trays, and a weir between said bubble caps and the inlet to said downpipe.

References Cited by the Examiner

UNITED STATES PATENTS

| 1,888,048 | 11/32 | Nelson | 261—114 |
| 2,916,527 | 12/59 | Adams et al. | 261—114 X |

FOREIGN PATENTS

| 207,477 | 3/09 | Germany. |

MORRIS O. WOLK, *Primary Examiner.*

JAMES H. TAYMAN, Jr., *Examiner.*